United States Patent [19]

Stange et al.

[11] E Patent Number: Re. 32,541

[45] Reissued Date of Patent: Nov. 10, 1987

[54] FLUIDIC FEEDING OF DOCUMENTS TO AN EXPOSURE STATION

[75] Inventors: Klaus K. Stange, Pittsford; Richard E. Smith, Webster; Thomas J. Hamlin, Macedon; James R. Cassano, Penfield, all of N.Y.

[73] Assignee: Xerox Corporation, Stamford, Conn.

[21] Appl. No.: 281,145

[22] Filed: Jul. 7, 1981

Related U.S. Patent Documents

Reissue of:

[64] Patent No.: 4,109,903
Issued: Aug. 29, 1978
Appl. No.: 824,885
Filed: Aug. 15, 1977

U.S. Applications:

[63] Continuation of Ser. No. 053,864, Jul. 2, 1979, abandoned, which is a continuation of Ser. No. 649,371, Jan. 15, 1976, abandoned.

[51] Int. Cl.[4] ..... B65H 5/22; B65H 29/00

[52] U.S. Cl. ..... 271/3; 271/9; 271/186; 271/902; 355/14 SH

[58] Field of Search ..... 271/3, 3.1, 4, 9, 65, 271/97, 195, 196, 186, 276, DIG. 9, 236, 291, 301,902; 355/23, 24, 25, 26, 75, 3 R, 3 SH, 14 R, 14 SH, 47-51; 360/88, 91; 353/25, 27 R; 406/72

[56] References Cited

U.S. PATENT DOCUMENTS

| | | | |
|---|---|---|---|
| Re. 27,976 | 4/1974 | Sahley | 271/4 X |
| Re. 29,178 | 4/1977 | Colwill | 271/3.1 X |
| 2,822,172 | 2/1958 | Mayo et al. . | |
| 3,227,444 | 1/1966 | Egan | 271/65 |
| 3,293,414 | 12/1966 | Barcia | 406/72 |
| 3,318,212 | 5/1967 | Rubin . | |
| 3,406,382 | 10/1968 | Wilmer | 271/9 X |
| 3,416,791 | 12/1968 | Beckman, Jr. et al. | 271/65 |
| 3,506,347 | 4/1970 | Carlson . | |
| 3,511,495 | 5/1970 | Schonfeld . | |
| 3,536,398 | 10/1970 | Bhagat | 355/3 |
| 3,552,739 | 1/1971 | Roberts et al. | 271/4 |
| 3,556,511 | 1/1971 | Howard et al. | 271/4 |
| 3,556,512 | 1/1971 | Fackler | 271/4 |
| 3,556,513 | 1/1971 | Howard | 271/4 |
| 3,615,129 | 10/1971 | Drawe et al. . | |
| 3,624,807 | 11/1971 | Schwebel | 271/236 |
| 3,630,607 | 12/1971 | Korn et al. . | |
| 3,645,615 | 2/1972 | Spear | 271/9 X |
| 3,659,837 | 5/1972 | Umahashi | 271/9 |

(List continued on next page.)

FOREIGN PATENT DOCUMENTS 1128295 10/1962 Fed. Rep. of Germany ..... 271/3.1

OTHER PUBLICATIONS

Rogers, J. C. et al. "Document Feed", *IBM Tech. Disc. Bull.*, vol. 14, No. 5, Oct. 1971, p. 1547.

Research Disclosure No. 14,927, vol. 149, Sep. 1976, pp. 18-20.

Research Disclosure No. 15766, vol. 157, May 1977, pp. 77-79.

Research Disclosure, No. 13329-"Document Feeder", vol. 133, May 1975, p. 21.

*Primary Examiner*—Joseph J. Rolla

[57] ABSTRACT

A system wherein documents are presented to an exposure station of reproduction apparatus includes a housing in which a rack for storing documents is located. The rack includes a plurality of pockets in each of which a document may be stored, the rack being movable in a vertical direction so that any one of its pockets may be aligned with an opening in the housing. Fluid streams are used to either move a document in an aligned pocket through the opening and to the exposure station or from the exposure station into the pocket. Copies of documents presented to the exposure station are made by the reproduction apparatus. Adjacent the housing there is located an inverter into which documents from the rack are fluidically fed as desired. Inverted documents are returned to the rack with the assistance of a fluid stream. Inverted documents may be fed to the exposure station to provide duplex copies.

26 Claims, 7 Drawing Figures

U.S. PATENT DOCUMENTS

| | | | |
|---|---|---|---|
| 3,671,118 | 6/1972 | Fantuzzo et al. | 355/3 |
| 3,672,765 | 6/1972 | Altmann . | |
| 3,675,999 | 7/1972 | Komori et al. | 355/23 |
| 3,687,541 | 8/1972 | Aser et al. | 355/14 |
| 3,697,171 | 10/1972 | Sullivan | 355/3 X |
| 3,709,595 | 1/1973 | Turner et al. | 355/14 |
| 3,775,102 | 11/1973 | Punnett | 355/3 X |
| 3,799,537 | 3/1974 | Cobb | 271/3 |
| 3,844,653 | 10/1974 | Kelly | 355/24 X |
| 3,844,654 | 10/1974 | Guenther . | |
| 3,856,295 | 12/1974 | Looney | 271/65 |
| 3,862,802 | 1/1975 | Till | 271/3 X |
| 3,866,904 | 2/1975 | Stemmle | 271/65 X |
| 3,869,202 | 3/1975 | Tabata et al. | 271/3 X |
| 3,888,579 | 6/1975 | Rodek et al. . | |
| 3,947,270 | 3/1976 | North . | |
| 3,963,345 | 6/1976 | Stemmle et al. | 271/3 X |
| 3,980,406 | 9/1976 | Lang . | |
| 4,034,869 | 7/1977 | Stange et al. . | |
| 4,035,073 | 7/1977 | Del Vecchio | 355/24 |
| 4,040,616 | 8/1977 | Clarkson et al. | 271/65 |
| 4,049,255 | 9/1977 | Stange et al. | 271/3 |
| 4,059,260 | 11/1977 | Stange et al. | 271/3 |
| 4,066,252 | 1/1978 | Wick | 271/3 |
| 4,066,254 | 1/1978 | Stange et al. | 271/236 |
| 4,073,001 | 2/1978 | Stange | 271/236 X |
| 4,078,787 | 3/1978 | Burlew et al. | 271/3.1 |
| 4,089,515 | 5/1978 | Stange et al. | 271/3 |
| 4,099,150 | 7/1978 | Connin | 271/3.1 X |
| 4,130,274 | 12/1978 | Stange | 271/236 |
| 4,140,387 | 2/1979 | Gustafson | 271/3.1 X |
| 4,159,824 | 7/1979 | Stange et al. | 271/3 |
| 4,166,614 | 9/1979 | Hamlin et al. | 271/3.1 |
| 4,169,674 | 10/1979 | Russel | 355/14 |
| 4,171,131 | 10/1979 | Stange et al. | 271/236 |

FLUIDIC FEEDING OF DOCUMENTS TO AN EXPOSURE STATION

Matter enclosed in heavy brackets [ ] appears in the original patent but forms no part of this reissue specification; matter printed in italics indicates the additions made by reissue.

*This is a continuation of application for reissue Ser. No. 053,864, filed July 2, 1979, now abandoned.*

This is a continuation of application Ser. No. 649,371, filed Jan. 15, 1976, now abandoned.

The subject invention generally relates to reproduction systems of the type wherein documents are posed at an exposure station, such as the platen on which original documents are placed in xerographic copiers or duplicators, and to transports used to register articles carried thereby, such as disclosed in co-pending U.S. patent application Ser. No. 627,571, Pneumatic Registration Apparatus, filed on Oct. 31, 1975, now abandoned and replaced by continuing application Ser. No. 775,508, filed on Mar. 8, 1977, on an invention by Klaus K. Stange, *now U.S. Pat. No. 4,130,274*, and U.S. patent application Ser. No. 638,590 Document Handling Apparatus, filed on Dec. 8, 1975, on an invention by Klaus K. Stange, et al., now U.S. Pat. No. 4,059,260 the applications being assigned to the assignee herein, Xerox Corporation.

As is well known to those familiar with commercial xerographic copiers, such as the Xerox 4000, copies of documents may be made by placing an original with an image to be copied in contact with a platen, by placing a cover over the located document and platen, and by actuating a button which initiates a machine cycle to produce a copy. In the machine process, a light image of the original is projected onto a charged photoconductive surface to produce a charge image and, subsequently, the charge image is developed with toner. The resulting toner image is thereafter transferred to copy paper and fused, the location of the fused image on the copy paper being dependent on the location of the original document on the platen. Because of this dependency, when it is desired that the location of a fused image on a copy correspond to the location of information on an original document, such document must be located precisely on a predetermined area of the platen. Obviously, this is a time-consuming operation. In such systems when it is desired to make collated copies of a plurality of documents, the cover must be lifted at least once for each copying operation or a collator must be used. If duplex copies are required, the cover must be lifted twice to produce a copy. Indeed, repeated lifting of a cover can be a tiring operation for a machine operator.

It is an object of the present invention to provide a reproduction system for automatically posing or registering documents at an exposure station.

It is another object of the present invention to provide a reproduction system wherein documents are fluidically fed, posed, stored, and inverted.

A still further object of the invention is to provide a reproduction system wherein either side of a document may be registered fluidically at an exposure station and wherein a copy thereof is provided.

Briefly, the invention herein provides a reproduction system capable of providing simplex or duplex copies of documents. Structurally, the invention may be implemented with (a) reproduction apparatus having an exposure station; (b) a rack having a plurality of pockets for storing documents; (c) means for moving any one of the pockets to a predetermined location; (d) fluidic means for moving a document from the exposure station into a pocket at said predetermined location or from said pocket to the exposure station; and (e) means for inverting documents in any one of said plurality of pockets.

Additional objects and features of the invention will become apparent by reference to the following description in conjunction with the accompanying drawings, in which.

Figure 1:
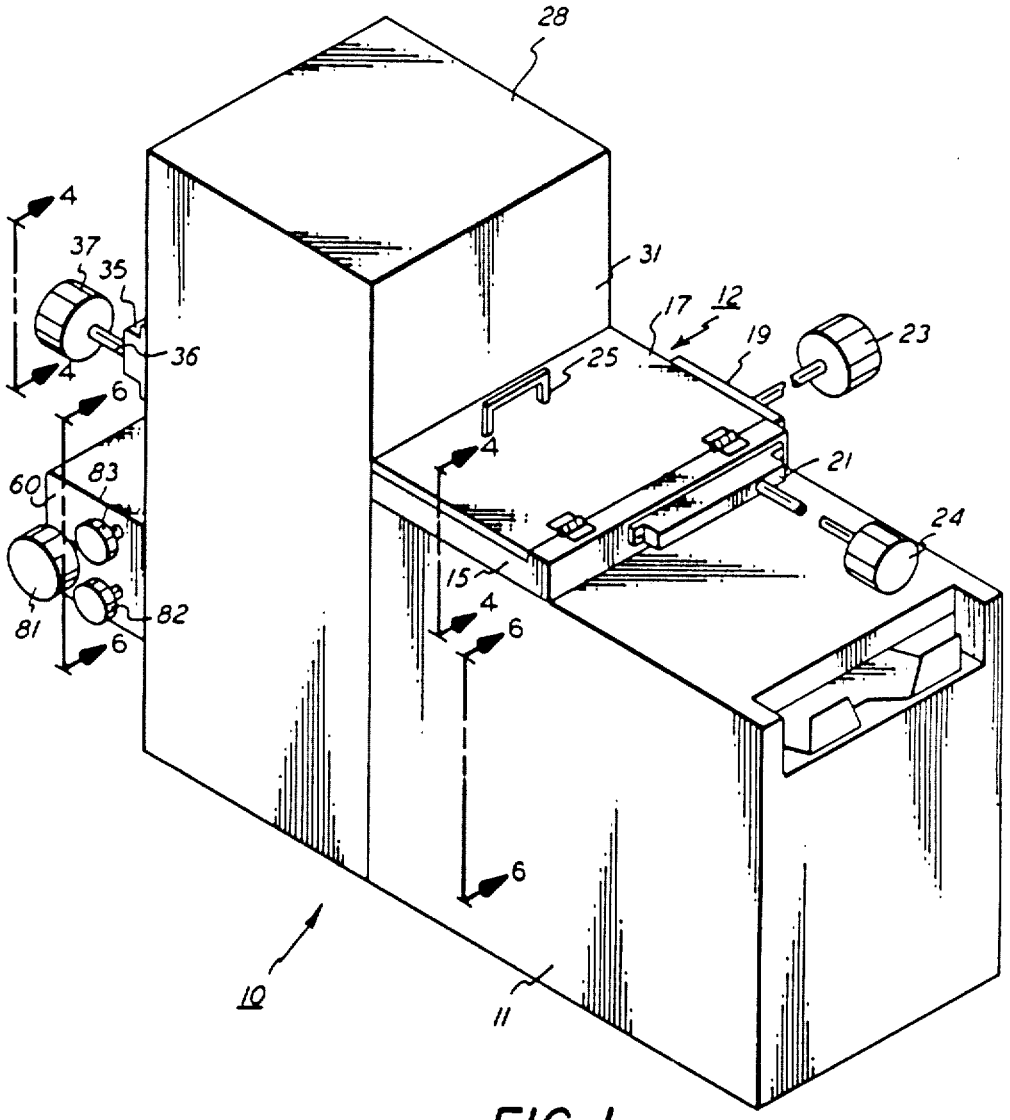
FIG. 1 is a perspective view of a reproduction system, according to the invention.
Figure 2:
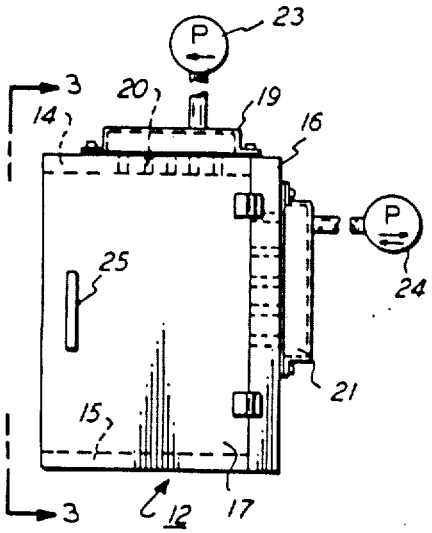
FIG. 2 is a top plan view of a covered exposure station of the system.
Figure 3:
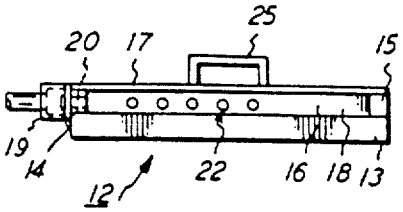
FIG. 3 is a side plan view of the exposure station, taken along line 3—3 in FIG. 2.

Referring to FIG. 1, an embodiment of a reproduction system 10, according to the present invention, includes reproduction apparatus 11 which, for example, may be a xerographic machine. Apparatus 11 includes an exposure station 12 having, as best seen in FIGS. 2 and 3, a rectangular transparent plate or platen 13, a spaced pair of rectangular bars 14 and 15 fixed to parallel edge sections of the platen and a rectangular member 16 fixed to the platen and bar to, amongst other things, pivotally support a platen cover 17. Bars 14 and 15 perpendicularly abut member 16, and as a result, the arrangement described provides a rectangular document pocket 18 when the cover is closed. Bar 14 supports a manifold 19 and includes a number of holes 20 communicating with the pocket and a chamber of the manifold. Similarly, member 16 supports a manifold 21 and includes a plurality of holes 22 communicating with the pocket and a chamber of manifold 21. Manifolds 19 and 21 are coupled to pumps 23 and 24, respectively, and as more fully described below are used to provide a fluid stream in the document pocket 18 for moving documents into registration with bar 14 and member 16. Pump 24 is also used for discharging documents from the pocket.

Figure 4:
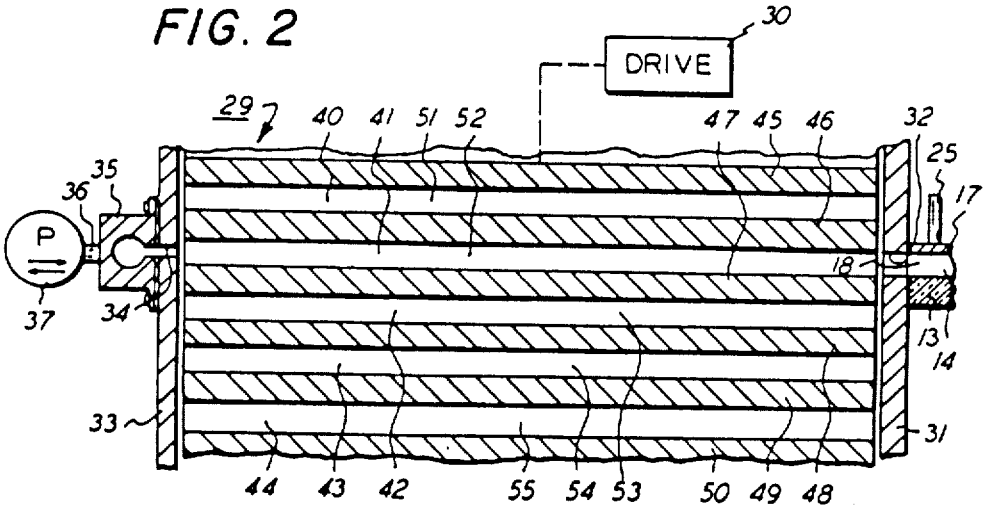
FIG. 4 is a partial cross-sectional view of a movable rack mounted adjacent to the exposure station, generally taken along lines 4—4 in FIG. 1.

Referring to FIGS. 1 and 4, apparatus 11 is stationed adjacent a rectangular housing 28 within which there is mounted a rack 29 and means for moving the rack up and down 30. Housing 28 includes on a wall 31 a horizontal opening 32 communicating with document pocket 18, and on a wall 33 a horizontally disposed series of slots 34 at the same level as opening 32. Wall 33 supports a manifold 35 having a chamber communicating with the slot, manifold 35 being coupled by a conduit 36 to a reversible pump 37.

Figure 5:
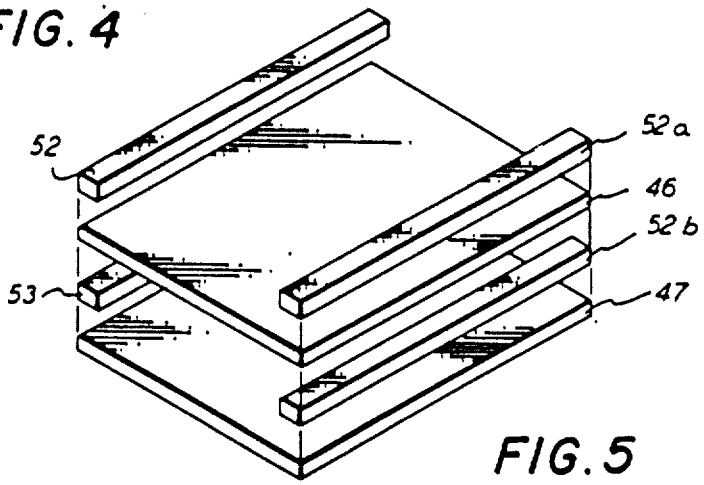
FIG. 5 is a partial exploded view of a rack.

Rack 29 is a rectangular structure having a plurality of storage pockets 40–44 (not all shown) extending horizontally between walls 31 and 33. As shown in FIGS. 4 and 5, the rack may be manufactured from plates 45–50 (not all shown); pairs of spacers 51–55 and 51a–55a (not all shown) interposed between plates; and means for securing the spacers and plates together.

Typically, the spacers and plates are fixed to each other with an adhesive; but, bolts (not shown) extending vertically through the plates and spacers and nuts cooperating therewith may be used.

The system thus far described may be operated as follows. An operator may engage handle 25 and lift cover 17 to align on platen 13 a document. After the cover has been closed, a copy may be provided by apparatus 11. Subsequently, pump 37 may be momentarily operated in a vacuum mode and pump 24 may be simultaneously operated in a pressure mode to fluidically transfer the exposed document into, for example, storage pocket 41. Rack 29 may then be stepped to provide an empty pocket in alignment with document pocket 18 and another document may be similarly processed. Since the copies thus provided may be inspected before a document is transferred to the rack, it will be appreciated that the rack may be loaded with documents capable of being reproduced satisfactorily. If after the rack has been loaded a copy of a document therein is required, the storage pocket in which the document is located is aligned with the document pocket 18, pump 37 is momentarily operated in a pressure mode, and pumps 23 and 24 are simultaneously actuated in a vacuum mode. As a result, the document desired is fluidically registered against bar 14 and member 16, and a copy may be made. At this point the document may be removed or returned in a manner such as described above. From the foregoing it will be appreciated that by synchronizing the stepping of the rack with the operative states of the pumps the procedure described may be used to provide collated copies of stored documents.

Figure 6:
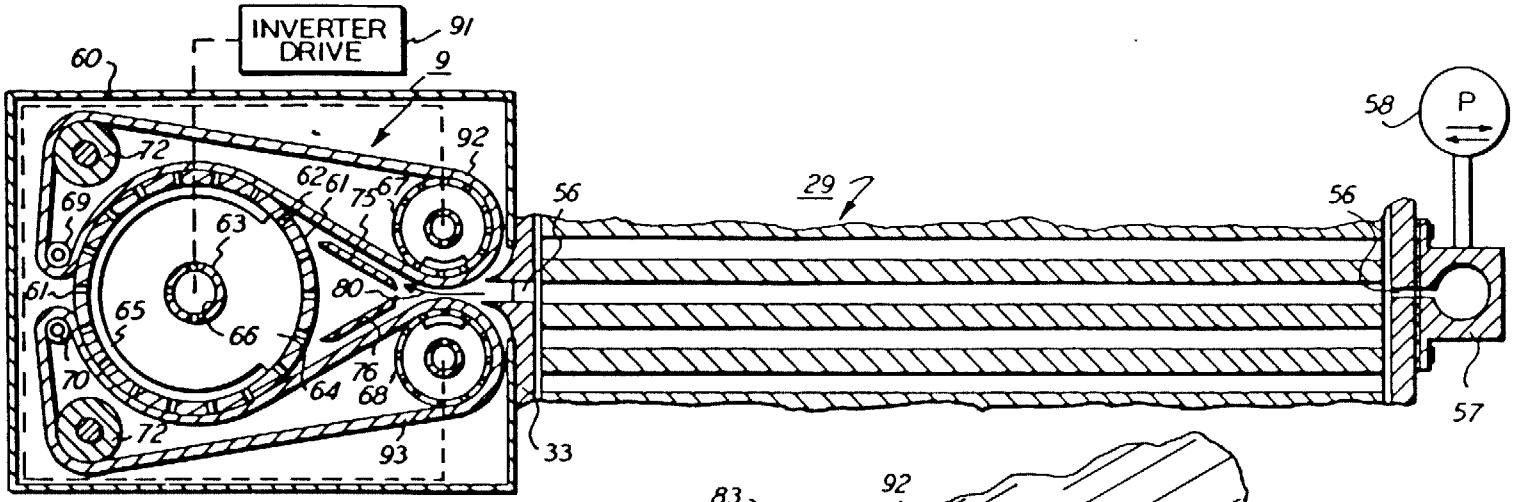
FIG. 6 is a cross-sectional view of an inverter mounted adjacent to the movable rack, generally taken along lines 6—6 in FIG. 1.

Referring to FIGS. 1 and 6, below opening 32 on wall 31 there is located a horizontally disposed series of slots 56 which communicates with the chamber of a manifold 57 coupled to a reversible pump 58. In addition, slots 56 are horizontally aligned with an opening 59 in wall 33. Opening 59 communicates with the space within a housing 60 for an inverter 9. As will be appreciated, a document in a storage pocket aligned with opening 59 may be moved through the opening by the operation of pump 58 in a pressure mode and a document returned into the rack through the opening will be drawn into a pocket by the operation of pump 58 in a vacuum mode.

Figure 7:
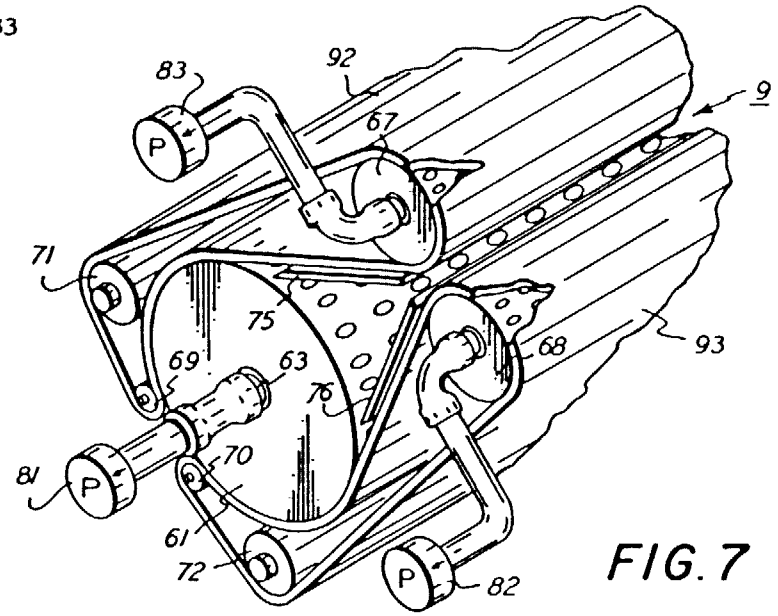
FIG. 7 is a perspective view of the inverter.

Referring to FIGS. 6 and 7, inverter 9 includes a hollow document drum 61 having a number of ports 62 extending through its cylindrical surface. Drum 61 is rotatably mounted on a shaft 63 supporting a cylindrical member 64 having a radially projecting land portion and the shaft is supported by the housing 60. The radial portion is in sliding contact with the inner surface of drum 61 and, as may be seen, member 64 provides an arcuate chamber 65 inside the drum. Shaft 63 includes a conduit 66 having axially and radially extending segments. The radial segments communicate with the chamber 65 and the axial section is coupled to a vacuum pump 81 which when turned on provides along an arcuate section of the cylindrical surface of the drum a vacuum pressure suitable for holding documents. The axis of shaft 63 is horizontally disposed at the same level as an opening in the housing 60 and opening 59, and above and below the opening there is mounted, respectively, vacuum rollers 67 and 68. Rollers 67 and 68 are similar to the vacuum drum and are similarly mounted so as to be capable of providing along facing arcuate sections a vacuum pressure. The rollers and the drum differ in that the drum is larger and its arcuate vacuum section subtends a larger number of degrees. Housing 60 also supports a pair of idler rollers 69 and 70 which are equidistant from an imaginary plane passing through the axis and opening 86 and are located on a region of drum 61 furthest from the vacuum rollers 67 and 68. In addition, housing 60 also supports a pair of drive rollers 71 and 72. Drive roller 71, idler roller 69, and vacuum roller 67 support a porous belt 92 in contact with an arcuate path adjacent drum 61; and drive roller 72, idler roller 70, and vacuum roller 68 support another porous belt 93 in contact with another arcuate path adjacent drum 61. The drive rollers 71 and 72, the document drum, and the vacuum rollers 67 and 68 are mechanically linked to a power source 91 such that belt sections in contact with drum 61 move therewith with the same tangential velocity and, therefore, it will be appreciated that the vacuum rollers always rotate in opposite directions. A pair of guide members 75 and 76 are located adjacent to the belts 92 and 93, respectively, in the region between the vacuum rollers and the drum to assist documents moving to or away from the drum.

Operatively, if no vacuum pressure is applied to roller 68 by pump 82 and vacuum pressure is supplied to roller 67 by pump 83, when a document enters the inverter 9, as indicated by arrow 80 in FIG. 6, vacuum pressure provided through belt 92 moves the document against the belt, and the document is guided into contact with drum 61. In FIG. 6 drum rotates counter clockwise and moves the document around. As the leading edge of the document disengages from belt 92, it is held to the drum by vacuum and is subsequently engaged by belt 93. Thereafter, the document is guided towards vacuum roller 68. With no vacuum pressure at roller 67 and vacuum pressure at roller 68, the document is fed back into a pocket, the document having been inverted.

From the foregoing it should be noted that rack may be stepped so as to align any of its pockets with opening 59 to invert stored documents and that the inverted documents may be exposed in apparatus 11. Thus, the system described may be used to provide duplex copies. Further, it should be noted that if openings 32 and 59 are located at suitable vertical levels copying and inverting operations may be executed at about the same time, thereby expediting the production of duplex copies.

As is apparent from the description set forth above, drive 30 must be capable of moving the rack 29 in increments related to the distance between pockets of the rack. As is well known to those skilled in the elevator and related arts, this may be accomplished with motors, pulleys, and sensors, or with rack and pinion drives.

It is to be understood that the description herein of a preferred embodiment, according to the invention, has been set forth as an example thereof and is not to be construed or interpreted to provide limitations on the claims which follow and define the invention.

What is claimed is:

1. Apparatus for storing and feeding selected sides of selected documents to and from an exposure station for copying the selected documents comprising:

(a) xerographic reproduction apparatus having an exposure station including a document exposure platen and liftable platen cover means for covering said platen and for providing a document exposure pocket over said platen;

(b) a rack having a plurality of superposed storage pockets for individually storing documents;

(c) means for moving a selected one of said storage pockets to a predetermined location adjacent said document exposure station;

(d) fluidic means for fluidicly moving a selected document into and out of one side of a selected said storage pocket into and out of said document exposure pocket over said platen for copying without lifting said platen cover means; and (e) inverting means for inverting documents in any selected one of said plurality of storage pockets;

(f) wherein said inverting means for fluidicly moving a selected document in and out of a selected storage pocket at a different side of said storage pocket than the side thereof utilized in said movement into and out of said document exposure pocket, and for inverting the document so moved so as to allow said document copying and inverting operations to be executed at about the same time, thereby expediting the production of duplex copies, and so that both sides of a selected document may be copied on said platen within said document exposure pocket formed by said platen cover means without lifting said platen cover means.

*2. Apparatus for storing and feeding documents to and from an exposure station for providing a reproduction system capable of providing simplex or duplex copies of the documents comprising:*

*(a) reproduction apparatus having an exposure station including a document exposure platen and liftable platen cover means for covering said platen;*

*(b) storage means for storing a plurality of documents;*

*(c) means for incrementally, in steps, moving documents out of said storage means to said exposure station at said platen to make a copy of the document without lifting said platen cover means, and then returning the document to said storage means, to make collated copies of said plurality of documents; and*

*(d) inverting means for individually inverting said documents;*

*(e) wherein said inverting means, said storage means and said means for moving documents provide for said document copying and inverting operations to be executed at about the same time, thereby expediting the production of duplex copies, and so that said inverted documents may be fed to said exposure station to provide duplex copies without lifting said platen cover means.*

*3. The apparatus of claim 2 wherein said reproduction apparatus is a xerographic copier or duplicator.*

*4. The apparatus of claim 2 wherein said documents are returned from said exposure station to said storage means after being copied on one side and then back to said exposure station to provide duplex copies.*

*5. The apparatus of claim 2 wherein said storage means stores said plurality of documents in superposed fashion and wherein said means for moving documents out of said storage means to said exposure station serially delivers the documents to said exposure station.*

*6. The apparatus of claim 5 wherein said documents are returned from said exposure station to said storage means after being copied on one side and then back to said exposure station to provide duplex copies.*

*7. The apparatus of claim 2 wherein said storage means is a single, integral storage member adapted to receive, hold and maintain the documents superposed in an original order both before and after said document copying and said document inverting.*

*8. The apparatus of claim 2 wherein said storage means has at least one document storage tray.*

*9. The apparatus of claim 2 wherein said storage means has at least one document storage tray and wherein said means for moving documents includes means for individually feeding a document from said document storage tray to said exposure station of said copier for making a copy of one side thereof and for returning said document back to the same said document tray after it has been so copied.*

*10. The apparatus of claim 2 wherein said inverting means provides for copying of both sides of said documents by moving each document through an arcuate inverting path after it has been copied on one side and before the other side thereof is copied and returning said document to said storage means.*

*11. The apparatus of claim 2 wherein said inverting means returns the documents back to said storage means, after one side thereof has been copied at said exposure station, in their original order therein but inverted.*

*12. The apparatus of claim 2 wherein said storage means is a single, integral storage member adapted to receive, hold and maintain the documents superposed in an original order both before and after said document copying and said document inverting, and wherein said storage means has at least one document storage tray, and said means for moving documents includes means for individually feeding a document from said document storage tray to said exposure station of said copier for making a copy of one side thereof and for returning said document back to the same said document tray after it has been so copied on one side and before the other side thereof is copied, and wherein said inverting means provides for copying of both sides of said documents by moving each document through an arcuate inverting path after it has been copied on one side and before the other side thereof is copied and returning said documents to said storage means in their original order therein but inverted.*

*13. A collating document feeder for sequentially presenting the respective pages of a multi-page document to a convenience copier, the document having a plurality of sheets defining first and second opposing faces, the copier including means for generating duplex copies on a flat support having first and second opposite faces; said feeder comprising:*

*a document supply including means for receiving and supporting the document sheets with the pages in an original order;*

*means for circulating and recirculating the respective sheets seriatim, removing the sheets one-after-another from said supply, presenting the removed sheets for copying and returning the copied sheets to said supply in the original order;*

*means for inverting the document sheets to present the first and second faces of the sheets for copying during circulation and recirculation of the sheets; and*

*means coordinating said circulating and recirculating means and said inverting means for producing collated duplex copies having pages corresponding in order to the original order of the multi-page document.*

*14. The collating document feeder of claim 13 wherein said document supply comprises means for storing the document sheets in superposed fashion.*

*15. The collating document feeder of claim 13 wherein said document supply is a single integral document storage means adapted to receive hold and maintain the document sheets superposed in an original order before and after said circulating.*

*16. The collating document feeder of claim 13 wherein said circulating and recirculating means and said inverting means returns each document sheet to said document supply after it has been copied on one side and inverted and before the other side thereof is copied.*

*17. The collating document feeder of claim 13 wherein said circulating and recirculating means and said inverting means executes said copying and inverting operations at about the same time.*

*18. The collating document feeder of claim 13 wherein said inverting means provides for copying of both faces of said document sheets by moving each document sheet through an arcuate inverting path after it has been copied on one face and before the other face thereof is copied and returning said document sheet to said document supply.*

*19. The collating document feeder of claim 13 wherein said inverting means returns the sheets to said document supply, after said copying presentation of one face thereof, in their original sheet order therein but inverted.*

*20. The collating document feeder of claim 13 wherein said document supply is a single intergral document storage means adapted to receive hold and maintain the document sheets superposed in an original order before and after said circulating, and wherein said document supply has at least one document sheet storage tray, and wherein said copier has a single document exposure station, and said circulating and recirculating means includes means for individually feeding a document sheet from said document sheet storage tray to said exposure station of said copier for making a copy of one side thereof and for returning said document sheet back to the same said document sheet storage tray after it has been so copied, and wherein said circulating and recirculating means and said inverting means executes said copying and inverting operations at about the same time, and wherein said inverting means moves each document sheet through an arcuate inverting path after it has been copied on one face and before the other face thereof is copied to return said document sheets to said document supply after said copying presentations of one face thereof in their original sheet order in said document supply but inverted.*

*21. The collating document feeder of claim 13 wherein said document supply has at least one document sheet storage tray.*

*22. The collating document feeder of claim 21 wherein said copier has a single document exposure station, and said circulating and recirculating means includes means for individually feeding a document sheet from said document sheet storage tray to said exposure station of said copier for making a copy of one side thereof and for returning said document sheet back to the same said document sheet storage tray after it has been so copied.*

*23. The collating document feeder of claim 22 wherein said document sheet is returned to said document sheet storage tray between said presentations of said first and second faces thereof.*

*24. The collating document feeder of claim 22 wherein said document sheet is returned to said document sheet storage tray inverted from its original orientation therein by said inverting means.*

*25. The collating document feeder of claim 13 wherein said copier has a single exposure station, and said circulating and recirculating means presents each document sheet to said exposure station of said copier for said copying.*

*26. The collating document feeder of claim 25 wherein said circulating and recirculating means and said inverting means includes means for automatically presenting to said exposure station the first faces and then the second faces of said document sheets, with said copying and inverting operations being executed at about the same time, thereby expediting the production of duplex copies.*

* * * * *

UNITED STATES PATENT AND TRADEMARK OFFICE

CERTIFICATE OF CORRECTION

PATENT NO. : Re. 32,541

DATED : November 10, 1987

INVENTOR(S) : Klaus K. Stange et al

It is certified that error appears in the above-identified patent and that said Letters Patent is hereby corrected as shown below:

Title page:

Item [63], the recited chain of U.S. applications should read as follows:

--Continuation of application for reissue Ser. No. 053,864, Jul. 2, 1979, abandoned. [,which] Original Patent No. 4,109,903 application Ser. No. 824,885 is a continuation of Ser. No. 649,371, Jan. 15, 1976, abandoned.--

Signed and Sealed this

Seventeenth Day of May, 1988

*Attest:*

*Attesting Officer*

DONALD J. QUIGG

*Commissioner of Patents and Trademarks*